(12) United States Patent
Hamada et al.

(10) Patent No.: US 7,884,314 B2
(45) Date of Patent: Feb. 8, 2011

(54) LIGHT GUIDE MECHANISM FOR GUIDING A LIGHT TO AN ILLUMINANCE SENSOR

(75) Inventors: Wataru Hamada, Kawasaki (JP); Yuji Takemoto, Kawasaki (JP); Toshiharu Hagii, Kawasaki (JP); Hui Young Kang, Kawasaki (JP); Masashi Tagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 12/318,276

(22) Filed: Dec. 23, 2008

(65) Prior Publication Data

US 2009/0250598 A1 Oct. 8, 2009

(30) Foreign Application Priority Data

Apr. 3, 2008 (JP) ............................. 2008-096988

(51) Int. Cl.
*G01J 1/04* (2006.01)
(52) U.S. Cl. ............................. 250/227.14; 250/208.1; 250/239
(58) Field of Classification Search ............ 250/227.14, 250/208.1, 239
See application file for complete search history.

(56) References Cited

U.S. PATENT DOCUMENTS 4,904,035 A  2/1990  Heckmann et al.
7,326,902 B2 *  2/2008  Nishikawa et al. ....... 250/208.1

FOREIGN PATENT DOCUMENTS

JP  01-113709  5/1989

* cited by examiner

*Primary Examiner*—Seung C Sohn
(74) *Attorney, Agent, or Firm*—Fujitsu Patent Center

(57) ABSTRACT

A light guide mechanism for an illuminance sensor includes: a lighting window configured to pass through an external light; the illuminance sensor configured to detect an illuminance of the light passed through the lighting window; and a light-blocking part provided between the lighting window and the illuminance sensor and configured to block a light other than the light passed through the lighting window. The light-blocking part has an inner surface inclined with respect to a line perpendicular to a light-receiving surface of the illuminance sensor. A direction of inclination of the inner surface is such that the inner surface faces the light-receiving surface of the illuminance sensor.

14 Claims, 5 Drawing Sheets

LIGHT GUIDE MECHANISM FOR GUIDING A LIGHT TO AN ILLUMINANCE SENSOR

CROSS-REFERENCE TO RELATED APPLICATIONS

This application is based upon and claims the benefit of priority of the prior Japanese Patent Application No. 2008-096988, filed on Apr. 3, 2008, the entire contents of which are incorporated herein by reference.

FIELD

The present invention relates to a light guiding mechanism that guides a light to an illuminance sensor.

BACKGROUND

Some electronic equipments having a display device, such as a mobile phone or a portable computer, are provided with a function to change a brightness of a display part in response to a surrounding light. For example, there is developed a mobile phone having a display part of which brightness is controlled automatically in response to a surrounding light. That is, a brightness of a display part is controlled so that a brightness is increased in a bright place to cause a display on a display part to be easily recognized and a brightness is decreased in a dark place to prevent an excessive brightness. There is a case in which a function to automatically turn on a back light when an atmosphere gets dark in order to cause operation keys to be visible by illuminating the operation keys from a backside when operating a mobile phone in a dark place.

In order to perform a control to automatically increase a brightness of a display part or automatically turn on a back light of operation keys, it is necessary to detect a surrounding light. Thus, an illuminance sensor, which detects a luminance, is incorporated into a mobile phone. A control part of the mobile phone controls a brightness of a display part or lighting of a back light of operation keys in accordance with a signal from the illuminance sensor.

In the case of a mobile phone, such an illuminance sensor is mounted to a board provided in the housing of the mobile phone in many cases. In the case where the illuminance sensor is mounted in the board provided in the housing of the mobile phone, it is necessary to pull in a surrounding light to the illuminance sensor from outside the housing of the mobile phone. Accordingly, a lighting window is provided to the housing of the mobile phone in order to take a light into the housing.

The above-mentioned lighting window is provided in the vicinity of a display part of a mobile phone in many cases. The lighting window is for leading a light incident thereon to an illuminance sensor inside the mobile phone. Thus, the illuminance sensor is preferably located directly under the lighting window. However, a display device such as a liquid crystal display device (LCD) is located between a board to which the illuminance sensor is mounted and a frame constituting the display part in many cases. In such a case, a distance between the lighting window and the illuminance sensor must be larger than the thickness of the liquid crystal display device (LCD). Thus, a light-blocking part, which blocks a space between the lighting window and the illuminance sensor so that a light other than an incident light through the lighting window does not enter through the space between the lighting window and the illuminance sensor.

FIG. 1 is a schematic illustration indicating a positional relationship between the lighting window, the illuminance sensor and the light-blocking part which blocks the space therebetween. As illustrated in FIG. 1, the space from the lighting window 1 to the illuminance sensor 2 is surrounded by the light-blocking part 3, and, thereby, no surrounding light (for example, a leaking light from a display device near the illuminance sensor 2) is incident on the illuminance sensor 2 because the surrounding light is blocked by the light-blocking part 3. Thus, by providing the light-blocking part 3 between the lighting window 1 and the illuminance sensor 2, a light traveling through parts other than the lighting window 1 is blocked so that the illuminance sensor 2 can detect an illuminance of the surrounding area with high accuracy.

It is suggested, as a structure for leading a light to a sensor, to cause a light exiting from an optical fiber to incident on a light-receiving element (sensor) after being passed through a tapered hole (for example, refer to Patent Document 1). This suggestion is to cause a light, which exits an optical fiber and has a small beam diameter, to incident on an entire surface of a sensor while being passed through a gradually enlarged tapered hole.

Patent Document 1: Japanese Laid-Open Patent Application No. 01-113709

Although a light exiting perpendicularly from the lighting window 1 is directly incident on the illuminance sensor 2 if the light-blocking par 3 as illustrated in FIG. 1 is provided, a light exiting obliquely from the lighting window 1 is incident on the illuminance sensor 2 after being reflected by an inner surface of the light-blocking part 3. Here, the light-blocking part 3 is integrally formed as a part of a housing or a frame of a mobile phone in many cases. In such a case, the light-blocking part 3 is in the same color as the housing or the frame of the mobile phone. For example, a black mobile phone has a black inner surface (a surface reflecting a light) of the light-blocking part 3, and a white mobile phone has a white inner surface (a surface reflecting a light) of the light-blocking part 3.

A reflectance differs from black to while, and a reflectance of white is larger than a reflectance of black. Accordingly, an amount of light incident on the illuminance sensor 2, when the white light-blocking part 3 is provided, is larger than an amount of light incident on the illuminance sensor 2 when the black light-blocking sensor 3 is provided. That is, if the same amount of light enters through the lighting window 1, an illuminance detected by the illuminance sensor 2 when the white light-blocking part 3 is provided is larger than an illuminance detected by the illuminance sensor 2 when the black light-blocking part 3 is provided, because an attenuation of light due to a reflection by the white light-blocking part 3 is smaller than an attenuation of light due to reflection by the black light-blocking part 3. As mentioned above, an illuminance detected by the illuminance sensor 2 varies depending on the color of a housing or the frame of a mobile phone, which generates variations in controlling a brightness of a display part and controlling in switching a back light of operation keys.

Thus, it is desirous to realize a light guide mechanism for the illumination sensor, which enables a detection of a luminance without influences of the color of the light-blocking part.

SUMMARY

There is provided according to an embodiment a light guide mechanism for an illuminance sensor, including: a lighting window configured to pass through an external light;

the illuminance sensor configured to detect an illuminance of the light passed through the lighting window; and a light-blocking part provided between the lighting window and the illuminance sensor and configured to block a light other than the light passed through the lighting window, wherein the light-blocking part has an inner surface inclined with respect to a line perpendicular to a light-receiving surface of the illuminance sensor, and a direction of inclination of the inner surface is such that the inner surface faces the light-receiving surface of the illuminance sensor.

Additional objects and advantages of the embodiment will be set forth in part in the description which follows, and in part will be obvious from the description, or may be learned by practice of the invention. The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

Preferred embodiment of the present invention will be explained with reference to the accompanying drawings.

Figure 1:
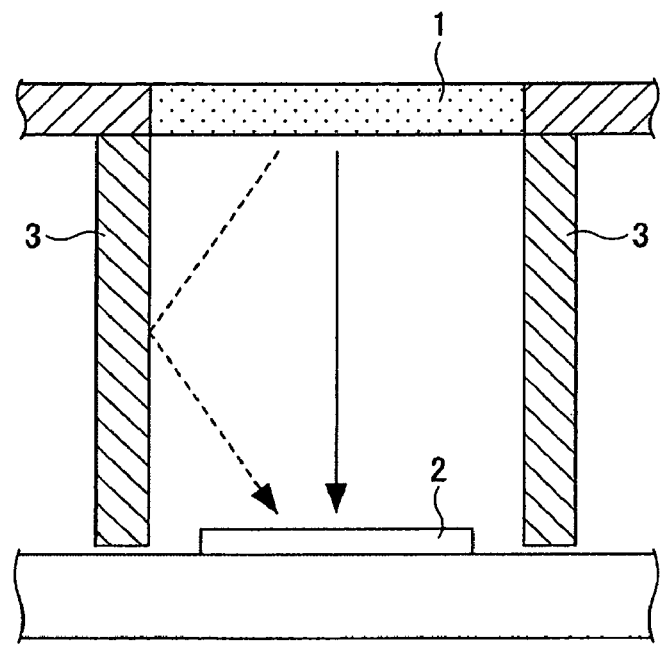
FIG. 1 is a schematic illustration indicating a positional relationship between a lighting window, an illuminance sensor and a light-blocking part blocking a space between the lighting window the illuminance sensor.
Figure 2:
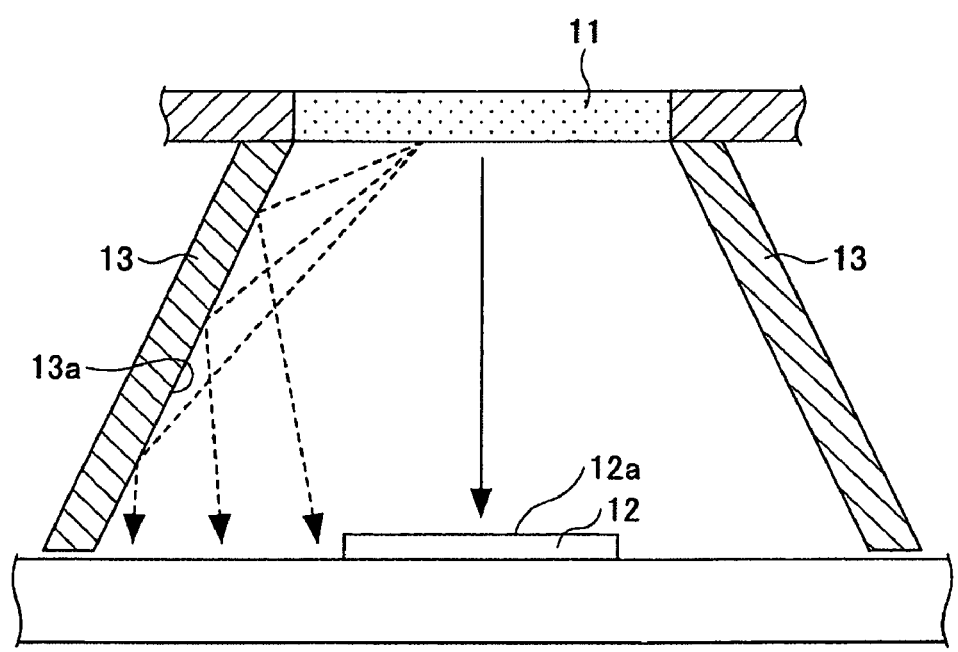
FIG. 2 is a schematic cross-sectional view of a light guide mechanism according to an embodiment.

FIG. 2 is schematic cross-sectional view of a light guide mechanism according to an embodiment. In FIG. 2, an illuminance sensor 12 is arranged opposite to a lighting window 11 with a predetermined distance therebetween so that a light passed through the lighting window 11 is incident on the illuminance sensor 2. The lighting window 11 is formed of a material, which scatters the transmitting light, so that a detected value of the illuminance sensor 12 does not have directivity.

The illuminance sensor 12 is a sensor for detecting an illuminance of the surrounding exterior of the lighting window 11. If a light other than the light, which has transmitted through the lighting window 1, is incident on the illuminance sensor 12, an illuminance of the surrounding area of the lighting window cannot be detected accurately. Thus, a light-blocking part 13 is provided in order to surround an empty space from the lighting window 11 and the illuminance sensor 12 to block a light from outside.

According to the present embodiment, an inner surface 13a of the light-blocking part 13 is inclined as illustrated in FIG. 2. The inclination of the inner surface 13a of the light-blocking part 13 is set so that a cross-sectional area of the empty space surrounded by the light-blocking part 13 increases in a direction from the lighting window toward the illumination sensor 12. In other words, the inclining direction of the inner surface 13a of the light-blocking part 13 is a direction in which the inner surface 13a faces the illuminance sensor 12. That is, the inner surface 13a of the light-blocking part 13 inclines with respect to a direction perpendicular to a light-receiving surface 12a of the illuminance sensor 12. In the case illustrated in FIG. 2, the lighting window 11 is arranged parallel to the light-receiving surface 12a of the illuminance sensor 12, and, thereby, a light exiting perpendicularly from the lighting window 11 travels in the direction perpendicular to the light-receiving surface 12a of the illuminance sensor 12. However, it is not always necessary to arrange the lighting window 11 parallel to the light-receiving surface 12a of the illuminance sensor 12.

According to the light guide mechanism illustrated in FIG. 2, the light traveling in the direction perpendicular to the light-receiving surface 12a from among lights transmitted through the lighting window 11 incident on the illuminance sensor 12 without change. On the other hand, a large part of the light traveling oblique to the direction perpendicular to the light-receiving surface 12a of the illuminance sensor 12 is reflected by the inner surface 13a of the light-blocking part 13 as indicated by dotted arrows in FIG. 2 and irradiated outside the illuminance sensor 12. Accordingly, a large part of the light reflected by the inner surface 13a of the light-blocking part 13 from among the light transmitted through the lighting window 11 is not incident on the illuminance sensor 12.

Therefore, even if a reflectance of the inner surface 13a differs due to difference in color of the light-blocking part 13, there is little influence given to the detected value of the illuminance sensor 12 by an amount (intensity) of light reflected by the inner surface 13a of the light-blocking part 13. That is, even if the light-blocking part 13 is set to any color, the detected value of the illuminance sensor 12 can fall in a predetermined range. In other words, an influence given to the detected value of the illuminance sensor 2 by the color of the light-blocking part 13 can be eliminated.

The cross-section of the empty space surrounded by the light-blocking part 13 can be a circle or a polygon. That is, the empty space formed by the inner surface 13a of the light-blocking part 13 can be a circle or a polygon including a square. For example, if the cross section of the empty space formed by the inner surface 13a of the light-blocking part 13 is a circle, the inner surface 13a of the light-blocking part 13 forms a conical shape expanding toward the illuminance sensor 2. Or, if the cross section of the empty space formed by the inner surface 13a of the light-blocking part 13 is a square, the inner surface 13a of the light-blocking part 13 forms a square pyramidal shape expanding toward the illuminance sensor 2.

Because an influence of the reflected light in the inclined portion can be reduced by providing an inclined portion to at least a part of the inner surface 13a of the light-blocking part 13, it is not always necessary to incline the entire inner surface 13a. Additionally, there is no need to incline the entire inner surface 13a at the same inclination angle.

Although the effect of reducing the influence of the reflected light increases as the inclination angle of the inner surface of the light-blocking part 13 increases, a larger space must be kept as the inclination angle increases. Thus, it is desirable to set the inclination angle of the inner surface 13a of the light-blocking surface 13 to be a maximum angle within the space which can be acquired around the illuminance sensor 12.

A description will be given of a result of verification on the effect of the inclined inner surface by producing samples of the above-mentioned light guide mechanisms. A light guide mechanism illustrated in FIG. 3A was produced as a sample of the light guide mechanism. The lighting window 11 was set to a square having a size of 1.5 mm×1.5 mm. The size of the light-receiving surface of the illuminance sensor 12 was set to 1 mm×1.6 mm. Additionally, a distance from the lighting window 11 to the light-receiving surface 12a of the illuminance sensor 12 was set to 2.5 mm. The inclination angle θ of the inner surface of the light-blocking part 13 was tan(0.5/2.5)=4.4 degrees.

Figure 3A:
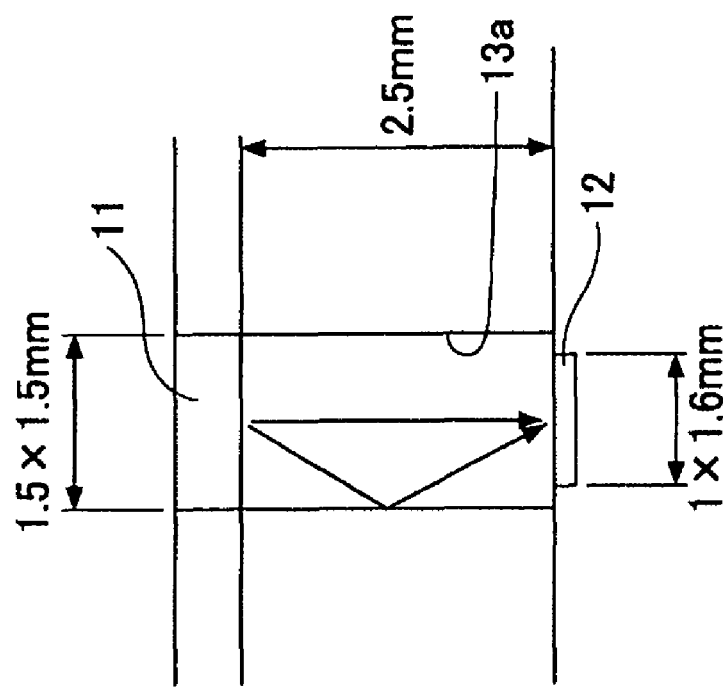
FIG. 3A is a schematic illustration of a sample of the light guide mechanism.
Figure 3B:
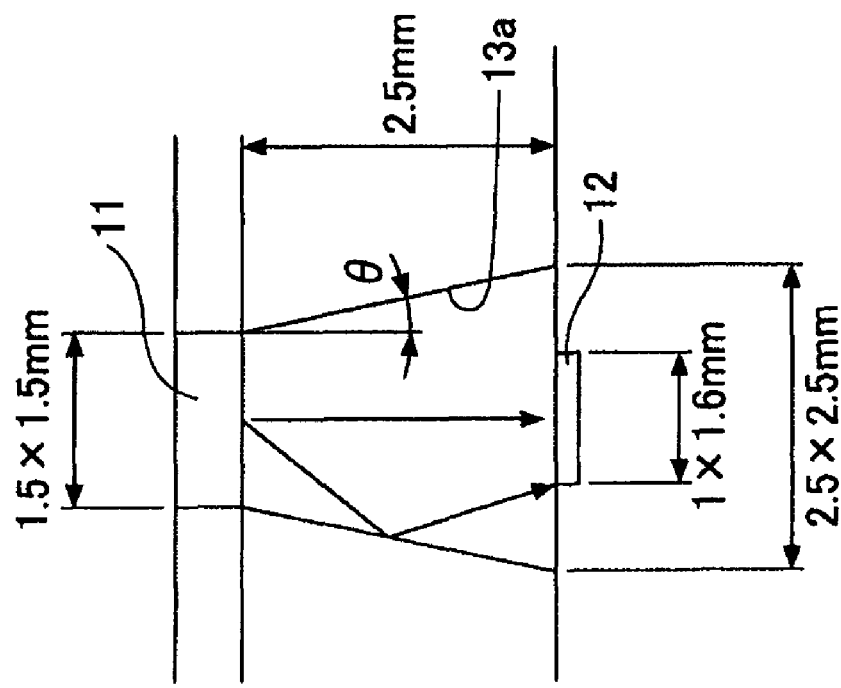
FIG. 3B is a schematic illustration of another sample of the light guide mechanism.

In addition to the light guide mechanism illustrated in FIG. 3A, a light guide mechanism having an inner surface (not an inclined surface) perpendicular to the light-receiving surface 12a of the illuminance sensor as illustrated in FIG. 3B was produced as an object for comparison.

First, detected values of the illuminance sensor 12 were compared under the same illuminance by setting the inner surface 13a to be white and black in the light guide mechanism illustrated in FIG. 3B. Here, the reflectance of white was 90% and the reflectance of black was 10%. When the outside of the lighting window 11 was set at an illuminance of 700 Lx, a ratio of the illuminance detected value of the illuminance sensor 12 when the inner surface 13a was black to the illuminance detected value when the inner surface 13a was white was 73%. That is, it was found that there is a difference of 23% in the illuminance detection value between white and black.

Next, detected values of the illuminance sensor 12 were compared under the same illuminance by setting the inner surface 13a to be white and black in the light guide mechanism illustrated in FIG. 3A. When the outside of the lighting window 11 was set at an illuminance of 700 Lx, a ratio of the illuminance detected value of the illuminance sensor 12 when the inclined inner surface 13a was black to the illuminance detected value when the inclined inner surface 13a was white was 86%. That is, when the inner surface 13a was inclined, it was found that there is a difference of only 14% in the illuminance detection value between white and black. Thus, it was found that the difference in the illuminance detected values between white and black between the cases where the inner surface is perpendicular and inclined was reduced and improved by (23−14)=40%.

If the difference in the illuminance detected value between the cases where the inner surface 13a is white and black, the detected illuminance value when the inner surface 13a is white is much higher than the detected illuminance value when the inner surface 13a is black even in a place of the same light. For example, in a case where brightness is determined by classifying illuminance values into several levels, if a difference between white and black is 23%, it may be determined as a level different by one stage between white and black.

On the other hand, there is no large difference between the illuminance value detected when the inner surface 13a is white and the illuminance value detected when the inner surface 13a is black if the difference in the detected illuminance values between the cases where the inner surface 13a is white and black. Accordingly, in the case where a brightness is determined by classifying the illuminance values into several levels, the determination can be done with the same level between white and black if the difference between white and black is within 14%, and, thereby, the same illuminance sensor can be used with the same adjustment and condition without change.

As mentioned above, the inclination angle of the inner surface of the light-blocking part 13 is not limited to 4.4 degrees as in the above-mentioned example, and it is desirous to determine the inclination angle in accordance with the illuminance value detected by the illuminance sensor, that is, an amount of light reflected by the inner surface 13a and incident on the illuminance sensor 12.

A description will be given of an example of the above-mentioned light guide mechanism being applied to a mobile phone.

Figure 4:
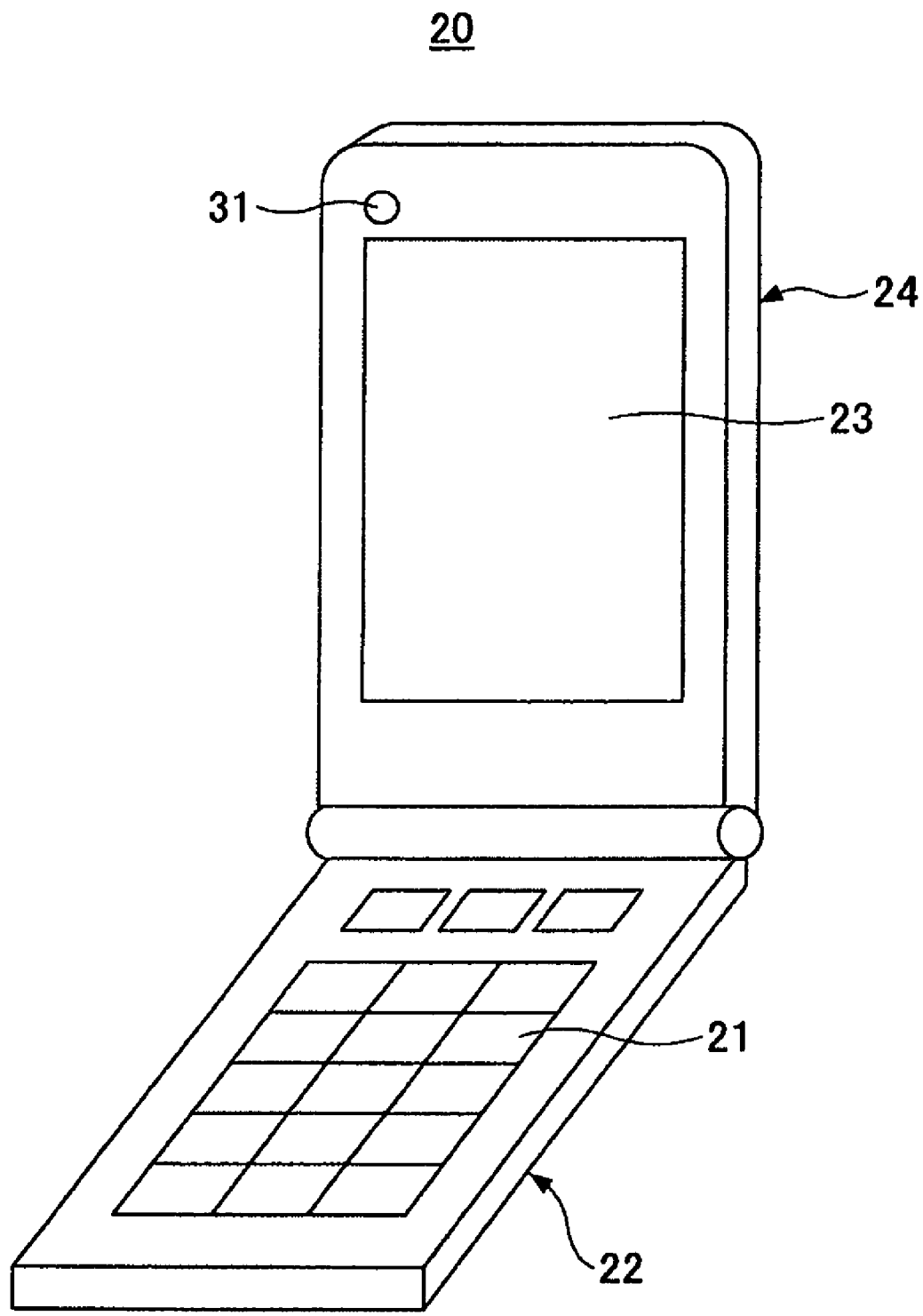
FIG. 4 is a schematic perspective view of a mobile phone to which the light guide mechanism according to the embodiment is applied.

FIG. 4 is a schematic perspective view of a mobile phone to which the light guide mechanism according to the present embodiment is applied. The mobile phone 20 illustrated in FIG. 4 includes an operation part 22 provided with operation keys 21 and a display part 24 provided with a display 23. The mobile phone 20 has a function to automatically adjust the brightness of the display 23 and a function to automatically turn on a back light of the operation part 22 to illuminate the operation keys 21 in response to brightness in the surrounding area.

An illuminance sensor is incorporated in a housing of the display part 24, and the housing of the display part 24 is provided with a lighting window 31. The illuminance sensor is arranged in the vicinity of the lighting window 31 so that a light entering through the lighting window 31 reaches the illuminance sensor, which is located in the housing of the display part 24.

The lighting window 31 is formed by applying a film, which transmits a light while scattering such as a frosted glass, onto a transparent cover covering the outer surface of the display 23, or forming such a film on the transparent cover by printing.

Figure 5:
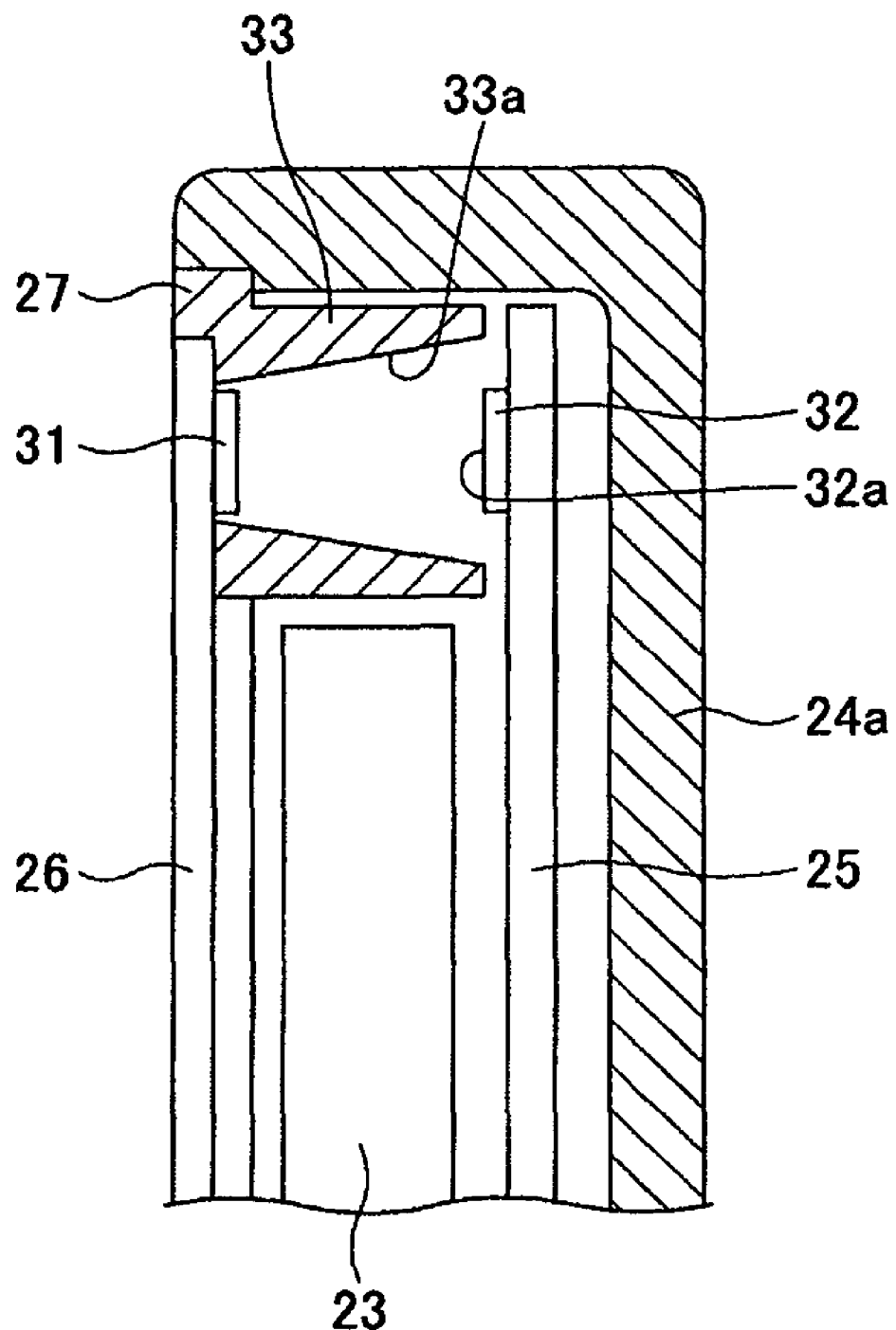
FIG. 5 is a cross-sectional view of the mobile phone shown in FIG. 4 where a lighting window is provided.

FIG. 5 is a cross-sectional view of a portion provided with the lighting window 31 of the mobile phone 20 shown in FIG. 4. A board 25 is accommodated in a housing 24a of the display part 24, and the illuminance sensor 32 is mounted on the board 25. The illuminance sensor 25 is arranged at a position facing the lighting window 31.

The lighting window 31 is formed on the transparent cover 26 arranged on the display 23, which is a display device. The transparent cover 26 is attached to a cover frame 27, and the cover frame 27 is attached to the housing 24a. Thus, it can be interpreted that the transparent cover 26 and the cover frame 27 are also a part of the housing 24a of the display part 24.

The display 23 is arranged directly under the transparent cover 26, and the board 25 extends on the backside of the display 23. Accordingly, the illuminance sensor 32 mounted on the board 25 is arranged at a position apart from the lighting window 31 by a thickness of the display 23. Thus, a light-blocking part 33 is provided in order to block a light in a space between the lighting window 31 and the illuminance sensor 32.

In the example illustrated in FIG. 5, the light-blocking part 33 is formed as a part of the cover frame 27 to which the transparent cover 26 is attached. The cover frame 27 serves as a part of the housing 24a, and the cover frame 27 is in various colors due to color variations of the mobile phone 20. For example, if the entire mobile phone 20 is on white basis, normally the cover frame 27 is also formed by a white resin. If the entire mobile phone 20 is on black basis, normally the cover frame 27 is also formed by a black resin. Accordingly, the light-blocking part 33 formed integrally with the cover frame 27 is in various colors such as black, white, etc.

Thus, in order to avoid the influence of the color of the light-blocking part 33, the above-mentioned optical guide mechanism is applied to the light-blocking part 33. That is, the inner surface 33a of the light-blocking part 33 is inclined with respect a direction perpendicular to the light-receiving surface 32a of the illuminance sensor 32. Thereby, a large part of the light reflected by the inner surface 33a of the light-blocking part 33 is irradiated onto outside the illuminance sensor 32, and the reflected light rarely gives an influence to the detected value of the illuminance sensor 32.

Therefore, the illuminance detected by the illuminance sensor 32 becomes the same value even if the color frame 27 is either white or black, and, thus, the same type of illuminance sensor 32 can be used under the same adjustment even if the color of the cover frame 27 is changed. In other words, there is no need to change a type and adjustment of the illuminance sensor 32 depending on the color of the cover frame 27, which simplifies a manufacturing process of the mobile phone 20 and reduces a manufacturing cost.

Figure 6:
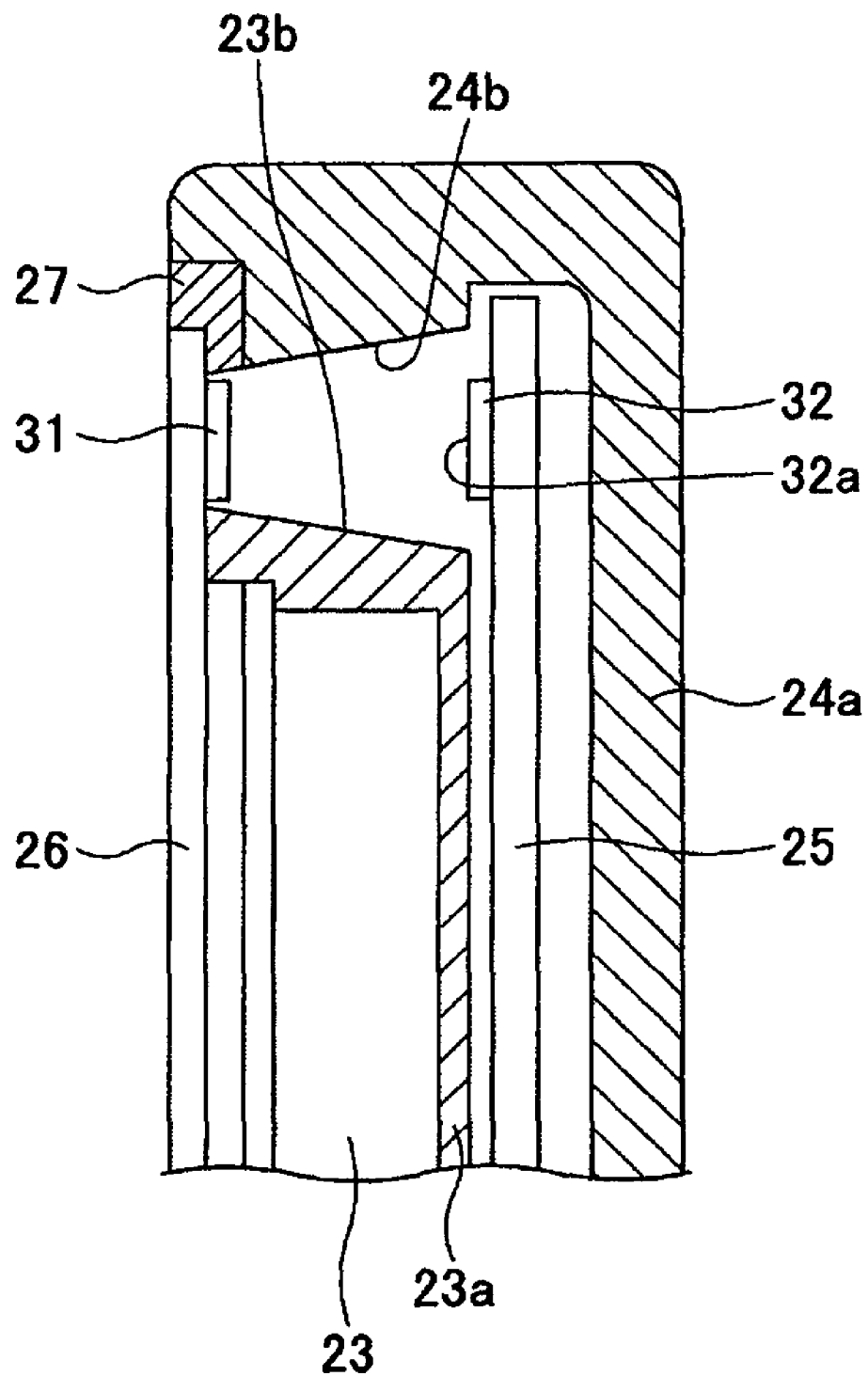
FIG. 6 is a cross-sectional view illustrating a variation of a light-blocking part illustrated in FIG. 5.

FIG. 6 is a cross-sectional view of a variation of the light-blocking part 33 illustrated in FIG. 5. The inner surface 32 of the light-blocking part 33 illustrated in FIG. 5 corresponds to a side end surface 23b of the frame 23a and an inner surface 24b of the housing 24a. That is, in the example illustrated in FIG. 5, instead of forming the light-blocking part on the cover frame 27, the inner surface 24b of the housing 24a is inclined to provide the same effect as the inclined inner surface 33a of the light-blocking part 33. Additionally, the side end surface 23b of a frame 23a, which accommodates the display 23, is also inclined in order to provide the same effect as the inner surface 33a of the light-blocking part 33.

Thus, there is no need to separately form the light-blocking part by forming a space between the lighting window 31 and the illuminance sensor 32 by the inner surface 24b of the housing 24a and a component part such as the frame 23a located near the illuminance sensor 32 as illustrated in FIG. 6. Thereby, a space for providing the light-blocking part can be eliminated, and the configuration near the illuminance sensor 32 can be simplified.

It should be noted that although an inner surface of the inclined part in a direction perpendicular to the drawing sheet is not indicated in the example illustrated in FIG. 6, an inclined surface the same as the inclined inner surface of the light-blocking part is provided in such a portion by using a part of the housing 24a or a component part near the illuminance sensor 32.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. A light guide mechanism for an illuminance sensor, comprising:
    a lighting window configured to pass through an external light;
    the illuminance sensor configured to detect an illuminance of the external light passed through the lighting window; and
    a light-blocking part provided between the lighting window and the illuminance sensor and configured to block a light other than the light passed through the lighting window, which travels toward an inner space from outside the light-blocking part, the inner space being formed at least by the light-blocking part,
    wherein the light-blocking part has an inner surface inclined with respect to a line perpendicular to a light-receiving surface of the illuminance sensor, and a direction of inclination of the inner surface that faces the light-receiving surface of the illuminance sensor.

2. The light guide mechanism according to claim 1, wherein the inner space includes an empty space having a circular or polygonal cross section, and at least a part of the empty space is inclined with respect to the line perpendicular to the light-receiving surface of the illuminance sensor so that a cross sectional area of the empty space increases toward the illuminance sensor.

3. The light guide mechanism according to claim 1, wherein an inclination angle of the inner surface of the light-blocking part is determined based on an amount of light reflected by the inner surface of the light-blocking part and incident on the illuminance sensor.

4. The light guide mechanism according to claim 1, wherein the light-blocking part is integrally formed with a housing to which the lighting window is provided.

5. The light guide mechanism according to claim 1, wherein a display device is arranged in a vicinity of the illuminance sensor, and a part of the display device forms a part of the light-blocking part.

6. The light guide mechanism according to claim 1, wherein the illuminance sensor is provided inside a device housing, and a part of the device housing forms a part of the light-blocking part.

7. The light guide mechanism according to claim 1, wherein the lighting window is formed of a material, which transmits a light while scattering the light.

8. A mobile phone comprising:
    a housing; and
    a light guide mechanism provided in the housing,
    wherein the light guide mechanism includes,
        a lighting window provided in the housing and configured to pass through an external light;
        an illuminance sensor provided in the housing and configured to detect an illuminance of the external light passed through the lighting window; and
        a light-blocking part provided between the lighting window and the illuminance sensor and configured to block a light other than the light passed through the lighting window, which travels toward an inner space from outside the light-blocking part, the inner space being formed at least by the light-blocking part,
    wherein the light-blocking part has an inner surface inclined with respect to a line perpendicular to a light-receiving surface of the illuminance sensor, and a direction of inclination of the inner surface that faces the light-receiving surface of the illuminance sensor.

9. The mobile phone according to claim 8, wherein the inner space includes an empty space having a circular or polygonal cross section, and at least a part of the empty space is inclined with respect to the line perpendicular to the light-receiving surface of the illuminance sensor so that a cross sectional area of the empty space increases toward the illuminance sensor.

10. The mobile phone according to claim 8, wherein an inclination angle of the inner surface of the light-blocking part is determined based on an amount of light reflected by the inner surface of the light-blocking part and incident on the illuminance sensor.

11. The mobile phone according to claim 8, wherein the light-blocking part is integrally formed with the housing to which the lighting window is provided.

12. The mobile phone according to claim 8, wherein a display device is arranged in a vicinity of the illuminance sensor, and a part of the display device forms a part of the light-blocking part.

13. The mobile phone according to claim 8, wherein a part of the housing forms a part of the light-blocking part.

14. The mobile phone according to claim 8, wherein the lighting window is formed of a material, which transmits a light while scattering the light.

* * * * *